May 30, 1939.　　　K. D. McMAHAN　　　2,160,666
FAN
Filed June 1, 1936　　　2 Sheets-Sheet 1
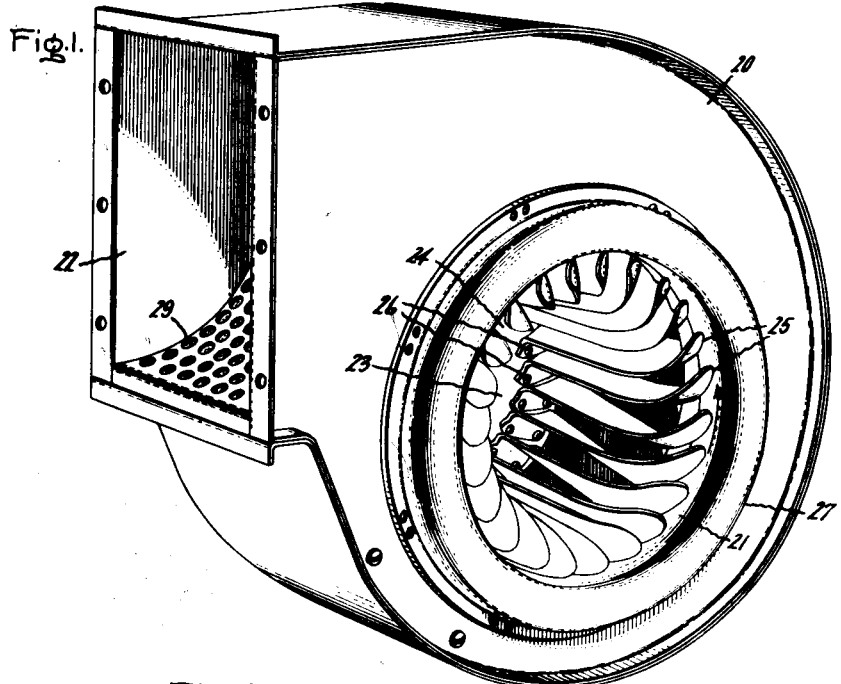
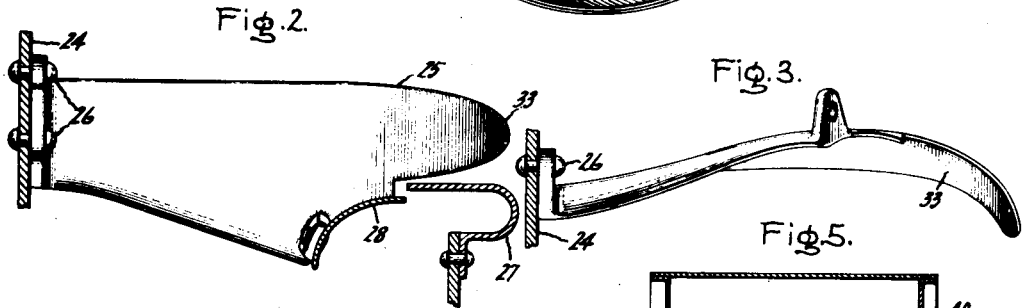
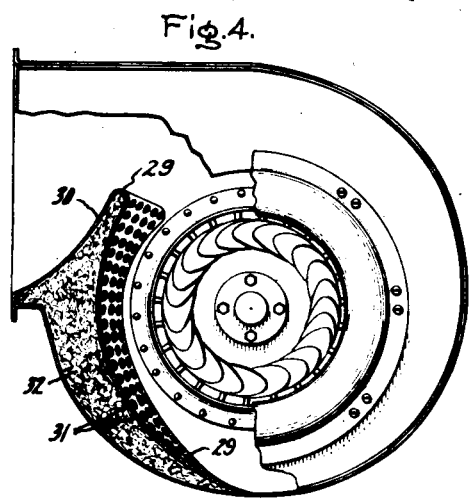
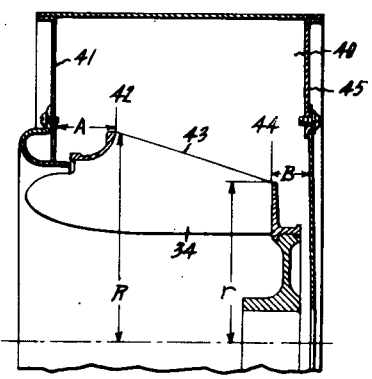
Inventor:
Kenton D. McMahan,
by Harry E. Dunham
His Attorney.

May 30, 1939.  K. D. McMAHAN  2,160,666
FAN
Filed June 1, 1936  2 Sheets-Sheet 2
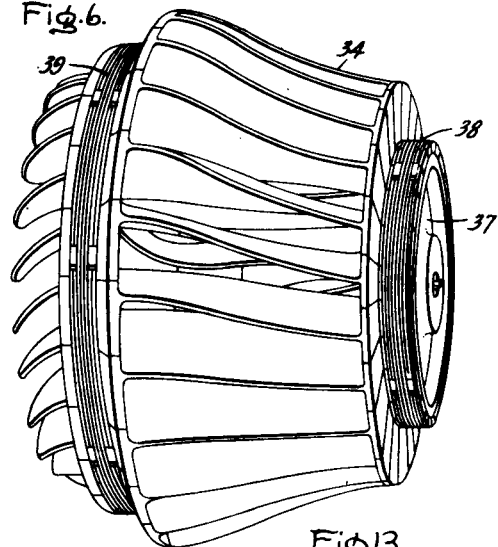
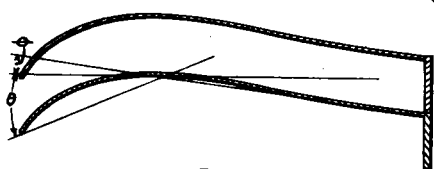
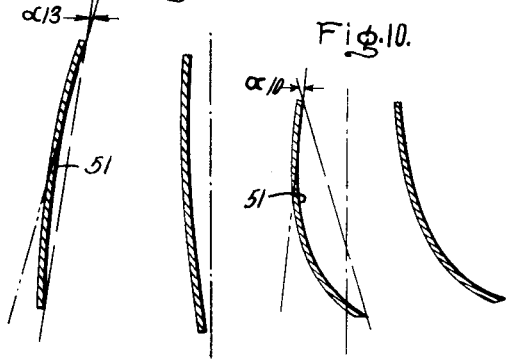
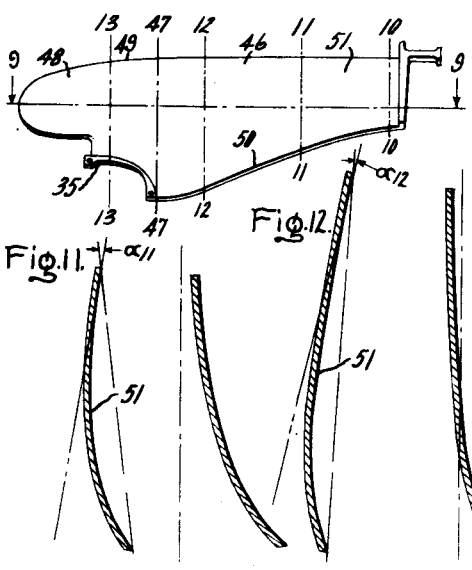
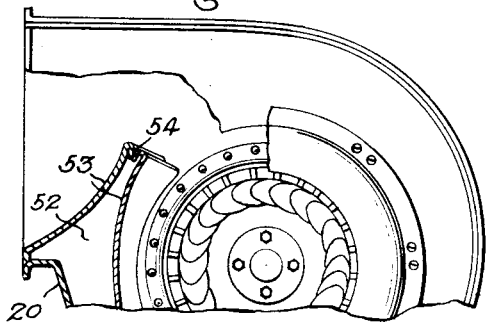
Inventor:
Kenton D. McMahan,
by Harry E. Dunham
His Attorney.

Patented May 30, 1939

2,160,666

UNITED STATES PATENT OFFICE 2,160,666

FAN

Kenton D. McMahan, Schenectady, N. Y., assignor to General Electric Company, a corporation of New York Application June 1, 1936, Serial No. 82,780

23 Claims. (Cl. 230—127)

My invention relates to fans and more particularly to fans of the centrifugal type which convert a velocity head into a pressure head.

An object of my invention is to provide an improved fan or centrifugal blower which operates at a high efficiency over a wide range of air flow with a minimum of noise.

What I consider to be novel and my invention will be better understood by reference to the following specification and appended claims when considered in connection with the accompanying drawings, in which Fig. 1 is a perspective view of my improved fan and casing; Fig. 2 is a plan view of one of the blades; Fig. 3 is a side view of one of the blades; Fig. 4 is a side view of the fan and casing with a part of the casing shown in section; Fig. 5 is an end sectional view of the fan and casing showing the positioning of a blade within the casing; Fig. 6 is a perspective view of the fan wheel with the casing removed; Fig. 7 is a side view of a modified construction of blade; Fig. 8 is a plan view of the blade of Fig. 7; Fig. 9 is a longitudinal sectional view of two adjacent blades cut by a cylinder along a line such as 9—9 of Fig. 8; Fig. 10 is a transverse sectional view of two adjacent blades cut by a plane perpendicular to the axis of rotation of the fan along the line 10—10 of Fig. 8; Fig. 11 is a similar transverse sectional view of two adjacent blades cut by a plane along the line 11—11 of Fig. 8; Fig. 12 is a similar transverse section along the line 12—12 of Fig. 8, Fig. 13 is a similar transverse section along the line 13—13 of Fig. 8 and Fig. 14 is a side view of the fan and casing with a part of the casing in section showing a modified form of cut-off.

Referring to the drawings, Figs. 1, 2, 3 and 4, 20 indicates a fan casing or scroll having an intake opening 21 and an exhaust opening 22. Mounted within the casing 20 is a fan wheel 23 consisting of a hub 24 to which is secured a plurality of blades 25 extending axially therefrom. Blades 25, as shown, are secured to hub 24 by means of rivets 26. Mounted in intake opening 21, is a curved orifice member 27 which serves to provide a smooth curved surface to the entering air to prevent any noise by the impinging of moving air against a sharp edge. Cooperating with orifice member 27 to provide a smooth path within the fan casing 20 is a shroud ring 28, which is secured to blades 25. Shroud ring 28 is formed as a substantial continuation of orifice member 27 and curves inwardly and outwardly in the direction in which air moves over this part of the fan but of necessity is spaced from the orifice member 27 a sufficient distance to provide the necessary clearance between a stationary and a moving part. In the exhaust opening 22 a cut-off 29 is provided which extends a sufficient distance within the opening 22 to prevent any eddies or reverse flow within the exhaust opening. Cut-off 29 is formed of a plate 30 separate from the wall of casing 20 having a plurality of perforations 31. Within the space between the plate 30 and the wall of casing 20, felt or other sound deadening material 32 is provided. The perforated plate 31 and sound deadening material 32 located at the cut-off serve to eliminate much of the noise originating from the impinging of air against the cut-off at its source. I may also accomplish this same result by using a cut-off with a space 52 between a solid plate 53 and the wall of casing 20 with an opening 54 at the inner end forming an air column acting as a cushion, as best indicated in Fig. 14. I have found that the location of sound deadening material or an air cushion, or both, at the cut-off can more effectually eliminate this noise than by any means located at a different point. The fan wheel 23 is connected to a source of power, not shown, such as an electric motor. Upon the operation of the fan, air is drawn into the intake opening 21 by means of a suction produced by the rotation of the fan wheel within the housing. This suction produces an axial flow in a column of air which is substantially conical. The conical shape of the air column entering the fan is due to the fact that the air is accelerated from a zero velocity at a considerable distance from the fan to a relatively high velocity upon its passage through the orifice of member 27 and as it increases in velocity the column of air decreases in cross-sectional area. This column of air continues to contract as it passes through the orifice of member 27 so that there is a tendency to produce an area adjacent the orifice member 27 where there is no uniform unidirectional flow of air. In such an area eddies are set up which interfere with the free flow of the air and produce considerable noise. To overcome this tendency and to produce a greater flow through the orifice of member 27, blades 25 are provided with curved front ends 33, as best indicated in Fig. 3. Front ends 33 extend substantially throughout the axial length of the orifice of member 27 and have an increasing rate of curvature toward the outer end of orifice member 27. As indicated by the arrow in Fig. 1, fan wheel 23 rotates in a counterclockwise direction and the curved front ends 33 of blades 25 extend in the direction of rotation of the fan wheel. Thus the curved ends 33 act substantially as propeller or disc type fan blades and produce an axial flow. The location of the curved ends 33 in the orifice of member 27 where the column of air tends to contract not only serves to overcome the tendency to produce eddies but it also greatly increases the amount of air drawn within the fan as the increase of air flow at this point more greatly increases the total flow of air than it would at a lesser radial distance from the axis because of the greater area of a cylindrical section of the same width but of a greater radius. As the air passes through the orifice of member 27 into the casing 20 between the blades 25 it begins to rotate under the influence of the rotating blades 25. However, the component of axial velocity tends to carry the air nearer the back of the blades and so there is a tendency to load the rear end of the blades more than the front end. This also tends to produce an uneven direction of flow and velocity distribution between the rear and front ends of the blades. Obviously such uneven loading reduces the efficiency of the fan and results in noise as eddies always are created where there is a great difference in velocity distribution and direction. To more evenly load the blades and to counteract the axial component or inward axial momentum of the air, the blades 25 are inclined rearwardly in an axial direction from the direction of rotation from the point at which the blades 25 are secured to the hub 24. The rearward inclination of the blades is best indicated in Fig. 3.

In Figs. 5 to 13 a modified form of blade construction is shown in which the blade 34 has an integral portion 35 of the shroud ring cast with it and an integral foot member 36. The blades 34 are adapted to be secured to a hub 37 and secured together by means of wire bindings 38 and 39. The surfaces of blades 34 are substantially identical to the surfaces of blades 25, as shown in Figs. 1 to 4. The means of securing the fan blades and shroud ring to the hub, as shown in Figs. 5 to 13 is not the applicant's invention but is the subject of a copending application Serial No. 82,821 filed June 1, 1936, by Hubbard and Stanton and assigned to the same assignee as this application.

Referring to Fig. 5, in which the position of the blade 34 within the casing 40 is best indicated, it will be seen that the distance from front wall 41 to the forward end 42 of the exhaust edge 43 of the blade 34 is greater than the distance from the rear end 44 of the exhaust edge 43 to the rear wall 45. It has been found that when the diameter of the wheel is greater at one end than the other, it is desirable to provide a larger spacing between the end of the wheel having the greater diameter and the adjacent wall of the casing than between the end of the lesser diameter and the adjacent wall. When the radius of the wheel R at the forward end of the discharge edge of the fan wheel is 1.33 times the radius $r$ at the rearward end of the discharge edge, the clearance A between the front end 42 of the discharge edge 43 and the wall 41 should be 1.65 times the clearance B between the rear end 44 of the discharge edge 43 and the wall 45.

For a clearer understanding of the surface shape and the action of the blades on the air passing through it, reference is made to Figs. 7 to 13. For the purposes of this discussion the blade will be considered as consisting of two parts, a rear end 46 which extends from the hub to a line 47, Fig. 8, which indicates the intersection of a plane perpendicular to the axis of rotation of the fan at the rear edge of the shroud ring 35 and a front part 48 which extends from the line 47 to the outer end. The intake edge 49 of the blade extends from the forward end of the shroud ring 35 around the front end 48 to the rear of the blade. The exhaust edge 50 extends from the rear of the shroud ring 35 to the rear of the blade. The face 51 is the front side or working surface of the blade. The air, in passing between two adjacent blades, is acted upon as though the blades were a nozzle taking air in at the intake edge 49 and discharging it at the exhaust edge 50. The intake nozzle area may be computed by measuring the space between adjacent blades normal of the face 51 of one blade along the intake edge 49 and multiplying it by the length of the intake edge 49. The nozzle discharge area is similarly computed by measuring the space between adjacent blades normal to the face 51 of the blade along the exhaust edge 50 and multiplying it by the length of the discharge edge 50. The air in its passage between blades is increased in velocity and pressure and so the volumetric discharge is less than the intake by the fan. The discharge from each nozzle formed by adjacent blades is in the form of a jet of air which may vary in velocity throughout the nozzle discharge area. These successive jets impinging against the walls and cut-off of the casing produce a vibration having a frequency equal to the number of blades times the number of revolutions of the fan wheel per unit of time. This vibration produces a noise the intensity of which depends upon the variation in the magnitude of the air velocity between successive jets. If the nozzle is running full and the discharge is of a uniform velocity throughout the discharge area the magnitude of the variation of the air velocity between successive jets will be small and so the intensity of the noise will likewise be small. I have found that to insure a full and even flow of air from the discharge nozzle area, the nozzle discharge area should be approximately .65 times the intake nozzle area. The ratio of the discharge nozzle area to the intake nozzle area may be varied from approximately .55 to .75 depending upon the speed of rotation of the wheel, the wheel diameter and the capacity of the fan. In Fig. 9 a longitudinal section of two adjacent blades is shown which section is cut by a cylinder with its axis coincident with the axis of rotation of the fan wheel cutting the blade 34 along line 9—9 of Fig. 8. As explained above, the front end 48 of the blade curves forwardly in the direction of rotation of the fan. The axial flow of air produced by this portion of the blade is determined by the angle the chord makes with a plane containing the axis of rotation of the fan and intersecting the face of the blade at the line 47 at which the front end joins the rear end of the blade. I have found that in order to secure a maximum efficiency and a minimum of noise this angle, designated in Fig. 9 as $\theta$, should be approximately 23°. The proper loading of the blade throughout its length is determined in part by the rearward inclination in an axial direction of the rear end 46 of the blade which is designated on the drawing as angle $\phi$ with the plane containing the axis of rotation of the fan and intersecting the face 51 of the blade along the jointure of the front and rear ends. I have found that the most satisfactory angle $\phi$ of inclination of the rear end of the blade is 8°. The angle $\theta$ may be varied from approximately 13° to 33° depending upon the speed of rotation of the fan, the fan wheel diameter, and the capacity of the fan. Similarly, the angle $\phi$ may be varied from 3° to 13° depending upon the range of operation of the fan diameter and its capacity.

A fan of this type is designed to operate efficiently and quietly over a wide range of air flow for a given size and speed. This makes fewer sizes necessary to completely cover any desired operating requirement of air flow and pressure. When the fan is operating in the higher flow range the axial forces are greater than when it is operating at a lower portion of the range. The rearward inclination in an axial direction of the rear end of the blade is designed to counteract the inward momentum of a high velocity stream of air. Obviously, when the fan is operating at the low end of the range the effectiveness of this rearward inclination is less as the velocity is less. To insure a proper loading of the blade when the fan is operating at the lower end of the range the blade is given a greater diameter and width at the front than at the rear of rear end 46. The greater diameter increases the peripheral velocity of the blade at its discharge edge 50 and so increases the centrifugal forces produced by the rotation of the blade in its action on the air. As pointed out above, when the air enters into the fan it begins to rotate before it comes in contact with the adjacent rotating blades. The rotational velocity of the air increases the further the air passes into the housing. Thus, the rotational velocity of the air coming in contact with the blade at its rear end for the first time is initially greater than the air entering at the front end of the blade. The greater width of blade compensates for the difference in rotational velocity of the air entering the blade at the front end so that the air discharging from the blade at the exhaust edge 50 throughout its length is substantially the same velocity. The greater width of blade also reduces the radial acceleration of air operated on by that part of the blade and the consequent noise produced thereby.

In Figs. 10 to 13, transverse sections of adjacent blades are shown which are cut by planes perpendicular to the axis of rotation intersecting the blades along the lines 10, 11, 12 and 13 respectively of Fig. 8. In each of these figures a dot-dash line is drawn which shows the trace of the intersection of the same plane containing the axis of rotation of the fan with each of the planes along which the sections are made. It will be seen from these sections that the face 51 of the blade is concave and is inclined at different angles at different points. This variation in the radial inclination of the blade along its length may be described as the skew of the blade. The angle between the chord of this curve and a radial line extending from the axis of rotation will be designated as the angle of skew of the blade at this point. It will be seen that the angle of skew decreases from the rear end of the blade throughout the length of the blade, as shown in Figs. 10, 11, 12 and 13. This angle of skew determines in a measure the effective change in the radial velocity imparted to the air in its passage from the intake edge to the exhaust edge by this portion of the blade. The angle of skew designated as $\alpha$ is the angle between the chord, shown as a dash-dash line, and the radial line intersecting the intake edge of the blade, shown as a dot-dot-dash line. I have found that for the most satisfactory operation the angle $\alpha$ should be approximately 23° at the rear end decreasing to 8° at the line 47 of jointure of the rear and front ends and then further decreasing to substantially zero at the outer end. The preferred angle $\alpha$ for each section shown in Figs. 10, 11, 12 and 13 are $\delta_{10}=23°$ $\alpha_{11}=17°$, $\alpha_{12}=10°$ and $\alpha_{13}=6°$, respectively. The difference between the angles $\alpha$ at the rear end and at the line 47 may be made as great as 25° depending upon the operating conditions of the fan and the relative difference between the radius R at the front end of the blade and the radius $r$ at the rear end of the blade. Similarly the difference between the angles $\alpha$ at the line 47 and at the outer end may be made as great as 18°. The maximum angle $\alpha$ at the rear end which can satisfactorily be used is approximately 38°. Since the air is discharged tangentially to blade surface the final discharge velocity is determined by the angle the tangent to the face of the blade at the exhaust edge makes with a radial line and the peripheral velocity of the exhaust edge at this point. When the face of the blade is concave and inclined forward radially in the direction of rotation of the fan at the exhaust edge the velocity of the air discharged is greater than the peripheral velocity of the blade at the exhaust edge. It will be seen in Figs. 10, 11 and 12 that while the diameter of the fan wheel increases from the rear end toward the front end, thus the peripheral velocity of the exhaust edge increases, the angle of discharge of the air decreases. This results in a substantial uniform velocity discharge throughout the length of the exhaust edge 50. As pointed out above the fact that the width of the rear end of the blade increases from the rear toward the front end also assists in producing a uniform velocity discharge and reduces the noise of the acceleration of the air. A uniform velocity distribution is of importance in addition to its effect on noise produced because a fan operating against a back pressure must produce a flow against this pressure and where the velocity is low at one point as compared with the velocity at other points along the discharge edge of the fan there is a pressure against which this portion of the fan will not produce any flow and at higher pressures there will even be a reverse flow. When such a condition is reached that a part of the fan is not producing any flow or there is even a flow in a reverse direction at one point it may be said that the fan has failed at that point and as a result the efficiency of the fan is greatly reduced and its operation is unstable resulting in increased noise. By producing a uniform velocity distribution the fan will not fail at any one point until a condition is reached under which the fan will not operate at all. This results in a more efficient and quiet fan throughout a wide range of flow conditions.

The two major sources of noise in the operation of a centrifugal fan have been discussed separately above but they have an effect on each other which is considered here. One of these sources of noise is the impinging of the successive jets of air from between adjacent blades against the walls and cut-off of the casing. The pitch of the sound produced by this source is equal to the number of blades times the speed of revolution of the fan together with some upper harmonics of this value and the magnitude depends upon the variation in the velocity distribution in the jets and between successive jets. When a large number of blades are used the space between adjacent blades is small, or, in other words, the nozzle area is small and the velocity distribution over such a small nozzle area is relatively uniform. Therefore, with a large number of blades the noise resulting from this source is less than when fewer blades are used. The other major source of noise is the acceleration of the air or the rate of change in velocity produced by the blade. With a narrow blade the change in velocity must be produced in a relatively short distance of travel and so the acceleration is high and considerable noise is produced thereby. Thus, the wider the blade the less the noise produced from this source. However, when a large number of blades are used to reduce the noise from the first mentioned source mechanical considerations make it impossible to use wide blades. Thus, as the number of blades is increased to reduce the noise from this source the width of the blades must be reduced and so the noise from this source is increased. Similarly, if the blades are increased in width to reduce the acceleration of the air and the noise from this source, the number of blades must be reduced and the noise from this source is increased. I have found that by reducing the number of blades to twenty-three and insuring a uniform distribution of velocity throughout the nozzle discharge area between adjacent blades, the noise produced as a result of the number of blades can be kept low and the blades can be made sufficiently wide to reduce the noise resulting from the acceleration of the air. Under different conditions of operation, it is possible to use a greater or lesser number of blades and a greater or lesser width of blade. However, for satisfactory operation under most conditions is is desirable to provide between 17 and 29 blades. The width of blade is determined by the diameter of the fan and the conditions under which the fan operates. The uniform velocity distribution over the wide nozzle area provided by the relatively few blades is accomplished by the curved front end, the axially inclined rear end of the blade, the variation in the angle of skew through the length of the blade increasing forward radially in the direction of rotation of the fan toward the rear of the blade, and the greater diameter of the fan at the front end of the discharge edge of the blade. The location at the cut-off of sound deadening material or a cushion further reduces any noise which may be produced by an uneven discharge from the fan. The greater diameter at the front end of the discharge edge of the blade also permits a wider blade at this point to provide a long contact area for the air passing over the blade and thus a path of gradual acceleration. The greater width is not necessary at the rear end of the blade as pointed out above because of the fact that the air has already begun to rotate before it comes in contact with that portion of the fan blade.

From the foregoing it may be seen that an improved fan has been provided, highly efficient in operation and from which most of the noise has been eliminated.

What I claim as new and desire to secure by Letters Patent of the United States is:

1. In combination, a fan casing having an inlet opening and an outlet opening, a curved orifice member secured in said inlet opening, a hub located in said casing, means to rotate said hub, a plurality of blades secured to said hub and extending axially therefrom, said blades being inclined at an angle rearwardly in axial direction from the direction of rotation of the hub and curved forwardly in the direction of rotation of the hub at the outer end, and a shroud ring secured to said blades adjacent said orifice.

2. In a fan, a hub, means to rotate said hub, fan blades secured to said hub and extending axially therefrom, said blades having a rear end inclined rearwardly in an axial direction from the point at which it is secured to said hub and a front end curved forwardly in the direction of rotation of the fan whereby the front end of the blade produces an axial component to increase the flow of air into the fan and the rear end opposes the axial component of flow to distribute the air evenly over the length of the blades.

3. A fan wheel comprising a hub, means to rotate said hub, fan blades secured to said hub and extending axially therefrom, said blades having a front end curved forwardly in the direction of rotation of the hub, and a shroud ring secured to said blades adjacent the front ends, said fan wheel having a greater diameter adjacent the front end than at the point where the blades are secured to the hub.

4. In a fan, a hub, means to rotate said hub, and a fan blade curved forwardly with an increasing rate of curvature throughout the front end of the blade, said blade increasing in width from the point at which it is secured to said hub substantially throughout the rear end.

5. In a fan, a hub, means to rotate said hub, and a blade secured to said hub and extending axially therefrom, said blade having a front end curved forwardly in the direction of rotation of the hub, a rear end increasing in width from the hub outwardly, and having a greater angle of skew at the hub than adjacent the front end.

6. In a fan wheel, a hub, means to rotate said hub, a plurality of blades secured to said hub and extending axially therefrom, a shroud ring secured to said blades near the outer end of the blades, said wheel increasing in diameter from the rear end to the point at which the shroud ring is secured to the blades, said blades having a surface with a front end curved forwardly in the direction of rotation of the wheel and extending beyond said shroud ring, said rear end having a greater angle of skew adjacent the hub than at the location of the shroud ring.

7. In combination, a fan casing having a front wall with an inlet opening and a rear wall, a fan wheel located in said casing having a plurality of fan blades, the diameter at the front end of the wheel being greater than at the rear end, the spacing between the front wall and the front end of the discharge edges of the blades being greater than the spacing between the rear edge and the rear wall of said casing.

8. In combination, a fan casing having a front wall with an inlet opening and a rear wall, a fan wheel located in said casing having a plurality of fan blades with the diameter at the front end 1.33 times the diameter at the rear end of the discharge side of the blades, and the spacing between the front wall and the front end of the discharge side of the blades being 1.65 times the spacing between the rear end of the discharge edge and the rear wall.

9. In a fan, a hub, means to rotate said hub, fan blades secured to said hub and extending axially therefrom, said blades having a rear end inclined rearwardly in an axial direction from the point at which it is secured to said hub and increasing in width outwardly and a front end curved forwardly in the direction of rotation of the fan.

10. In a fan, a hub, means to rotate said hub, fan blades secured to said hub and extending axially therefrom, said blades having a rear end inclined rearwardly in an axial direction from the point at which it is secured to said hub increasing in width from the hub and decreasing in angle of skew from the hub and a forward end curved forwardly in the direction of rotation of the fan.

11. In a fan, a hub, means to rotate said hub, fan blades secured to said hub and extending axially therefrom, said blades having a rear end inclined rearwardly in axial direction from the point at which it is secured to said hub, increasing in width outwardly, and decreasing in angle of skew from the hub, and a front end curved forwardly in the direction of rotation of the fan, the diameter of the fan being greater adjacent the front end of the blade than at the hub.

12. In a fan, a hub, means to rotate said hub, and fan blades secured to said hub and extending axially therefrom, said blades having an angle of skew decreasing from the hub and increasing in width outwardly, the diameter of the fan being greater at the outer end than at the hub.

13. In a fan, a hub, means to rotate said hub, fan blades secured to said hub and extending axially therefrom, said blades having a decreasing angle of skew from the hub outwardly, whereby the air passing through the fan is distributed evenly over the length of the blade and discharged with a uniform velocity over the discharge nozzle area between the blades.

14. In a fan, a hub, means to rotate said hub, and fan blades secured to said hub and extending axially therefrom, said blades having a decreasing angle of skew from the hub outwardly, the diameter of the fan being greater at the outer end than at the hub.

15. In a fan, a hub, and fan blades secured to said hub, said blades having an angle of skew of 23° at the hub decreasing to substantially zero at the front end.

16. In a fan, a hub, fan blades secured to said hub and extending axially therefrom, said blades having a rear end inclined rearwardly in an axial direction from the point at which it is secured to said hub, increasing in width outwardly, and decreasing in angle of skew outwardly, and a shroud ring secured to said fan blades.

17. In a fan, a hub, fan blades secured to said hub and extending axially therefrom, said blades having a rear end inclined rearwardly in an axial direction from the point at which it is secured to said hub increasing in width outwardly, and decreasing in angle of skew from the hub, and a shroud ring secured to said blades at the front end, the fan increasing in diameter from the hub outwardly.

18. In a fan, a hub, blades secured to said hub and extending axially therefrom, said blades being inclined rearwardly in an axial direction from the direction of rotation of the hub and having an outer end curved forwardly in the direction of rotation of the fan, the diameter of the fan being greater at the outer end than at the hub.

19. In a fan, a hub, means to rotate said hub and a blade secured to said hub and extending axially therefrom, said blade having a front end curved forwardly in the direction of rotation of the hub and having an angle of skew decreasing from the hub outwardly.

20. In a fan, a hub and blades secured to said hub and extending axially therefrom, said blades being inclined rearwardly in an axial direction from the direction of rotation of the fan having an outer end curved forwardly in the direction of rotation of the fan and an angle of skew decreasing from the hub outwardly.

21. In a fan, a hub, fan blades secured to said hub and extending axially therefrom, said blades having a rear end inclined rearwardly in an axial direction from the point at which it is secured to said hub, decreasing in skew angle from the hub, and a front end curved forwardly in the direction of rotation of the fan, the diameter of the fan being greater adjacent the front end of the blade than at the hub.

22. In a fan, a hub and fan blades secured to said hub and extending axially therefrom, said blades being inclined rearwardly in an axial direction and having a decreasing angle of skew from the hub outwardly, the diameter of the fan being greater at the outer end than at the hub.

23. A fan wheel comprising a hub, means to rotate the hub, fan blades secured to the hub and extending axially therefrom, said blades having inner intake edges defining a passage through which the air flows axially and outer discharge edges, said blades being inclined rearwardly in an axial direction from the direction of rotation of the hub at an angle to a radial plane through the axis of rotation of the hub, the inner edges of the blades at the front end projecting forwardly into the path of the axially flowing air, said fan wheel having a greater diameter adjacent the front end than at a point where the blades are secured to the hub.

KENTON D. McMAHAN.